(12) United States Patent
Reznik et al.

(10) Patent No.: US 11,936,693 B2
(45) Date of Patent: Mar. 19, 2024

(54) SYSTEM AND METHOD FOR APPLYING A POLICY ON A NETWORK PATH

(71) Applicant: Wiz, Inc., New York, NY (US)

(72) Inventors: Roy Reznik, Tel Aviv (IL); Matilda Lidgi, Tel Aviv (IL); Shai Keren, Tel Aviv (IL); Eliran Marom, Yehud-Monoson (IL)

(73) Assignee: WIZ, INC., New York, NY (US)

( * ) Notice: Subject to any disclaimer, the term of this patent is extended or adjusted under 35 U.S.C. 154(b) by 0 days.

(21) Appl. No.: 18/357,845

(22) Filed: Jul. 24, 2023

(65) Prior Publication Data
US 2023/0370499 A1 Nov. 16, 2023

Related U.S. Application Data

(63) Continuation-in-part of application No. 17/818,898, filed on Aug. 10, 2022, and a continuation-in-part of application No. 17/659,163, filed on Apr. 13, 2022, and a continuation-in-part of application No. 17/659,164, filed on Apr. 13, 2022, and a continuation-in-part of application No. 17/659,165, filed on Apr. 13, 2022.

(51) Int. Cl.
*H04L 9/40* (2022.01)
(52) U.S. Cl.
CPC .................. *H04L 63/20* (2013.01)
(58) Field of Classification Search
CPC ........................................... H04L 63/20
USPC ............................................... 726/1
See application file for complete search history.

(56) References Cited

U.S. PATENT DOCUMENTS

| 10,574,675 B2 | 2/2020 | Peppe et al. | |
|---|---|---|---|
| 2016/0140352 A1* | 5/2016 | Nickolov | H04W 12/02 726/26 |
| 2016/0366185 A1 | 12/2016 | Lee et al. | |
| 2017/0034198 A1 | 12/2017 | Powers et al. | |
| 2018/0004950 A1 | 1/2018 | Gupta et al. | |
| 2020/0389469 A1 | 12/2020 | Litichever et al. | |

(Continued)

OTHER PUBLICATIONS

International Search Report of PCT/IB2023/058074, dated Nov. 20, 2023. Searching Authority United States Patent and Trademark Office, Alexandria, Virginia.

(Continued)

*Primary Examiner* — Anthony D Brown
(74) *Attorney, Agent, or Firm* — M&B IP Analysts, LLC

(57) ABSTRACT

A system and method for applying a policy on a network path is disclosed. The method includes: selecting a reachable resource having a network path to access the reachable resource, wherein the reachable resource is a cloud object deployed in a cloud computing environment, having access to an external network which is external to the cloud computing environment; actively inspecting the network path to determine if the network path of the reachable resource is accessible from the external network; applying a policy on the accessible network path, wherein the policy includes a conditional rule; initiating a mitigation action, in response to determining that the conditional rule is not met; and applying the policy on another network path, in response to determining that the conditional rule is met.

21 Claims, 10 Drawing Sheets

(56) References Cited

U.S. PATENT DOCUMENTS

2021/0105304 A1    4/2021  Kraning et al.
2023/0136839 A1*  5/2023  Sundararajan ......... G06N 20/00
                                                  711/154

OTHER PUBLICATIONS

Written Opinion of the Searching Authority of PCT/IB2023/058074, dated Nov. 20, 2023. Searching Authority United States Patent and Trademark Office, Alexandria, Virginia.

* cited by examiner

403 Forbidden ⎯ 510

- Code: AccessDenied
- Message: Access Denied
- RequestId: 09PP3N3590KVTGWW
- HostId: uGXESStwa0lojg3nla9X81xD4e3eD1W1aArrL61yDteIHU8puUX24XUvoCD/4RQHFarJ1jAuuDI=

SYSTEM AND METHOD FOR APPLYING A POLICY ON A NETWORK PATH

CROSS-REFERENCE TO RELATED APPLICATIONS

This application is a continuation-in-part of U.S. Non-Provisional patent application Ser. No. 17/659,165 filed on Apr. 13, 2022. This application is also a continuation-in-part of U.S. Non-Provisional patent application Ser. No. 17/659,163 filed on Apr. 13, 2022. This application is further a continuation-in-part of U.S. Non-Provisional patent application Ser. No. 17/659,164, filed Apr. 13, 2022, and a continuation-in-part of U.S. Non-Provisional patent application Ser. No. 17/818,898 filed Aug. 10, 2022. The contents of all the above referenced applications are hereby incorporated by reference.

TECHNICAL FIELD

The present disclosure relates generally to exposure detection in cloud environments, and specifically to active detection of exposure in cloud environments.

BACKGROUND

External attack surface management (EASM) is a term which for a technology field and best practices which are utilized in cybersecurity to describe what vulnerabilities an organization has within their network infrastructure, which may include cloud computing environments, local network environments, and the like. For example, an organization may have a virtual private cloud (VPC) implemented in Amazon® Web Services (AWS), Microsoft® Azure, Google® Cloud Platform (GCP), and the like, which serves as a cloud computing environment. The cloud computing environment may include a plurality of workloads, such as virtual machines, container engines, serverless functions, and the like, any of which may pose a security risk, for example by having a vulnerability, allowing an attacker to infiltrate the organization's network in an unintended manner.

EASM technologies aim to discover where an organization is vulnerable, in order for a network administrator to secure the discovered vulnerabilities. For example, discovering an out-of-date operating system (OS) having a known vulnerability running on a virtual machine may require the network administrator to update the OS version, or apply a software patch, in order to address the vulnerability. This is also known as minimizing the external attack surface.

One such technology which may be deployed in order to discover the external attack surface is known is active scanning. Active scanning attempts to infiltrate a network (e.g., access resources in the above mentioned VPC). For example, by sending packets to endpoints in the network. Thus, an active scanner may attempt to access random domains, at random ports, in order to gain access to a network or to a network resource.

This method has some serious drawbacks. For example, attempting to guess random domains, random ports, and the like, creates a large volume of network traffic which the target (i.e., organization's network) must deal with. This may congest the network, and further risks malfunctions, such as a denial of service to other clients, data corruption from incompatible queries, and the like. It is often of upmost importance to an organization to keep a production environment in a fully operational state. Therefore, using an active scanner to test accessibility of an active production environment may be detrimental to this objective, since it would require devotion of substantial resources at least in terms of network bandwidth to perform such tests.

A cloud computing environment may limit the number of open ports the network provides, however in practice that limitation is often limited, opting instead to limit port access at the resource level. Thus, in order to discover if a resource includes an open port, a port scan may be utilized. A port scan involves determining what ports in a network, or network element (such as the resource), are open. An open port receives information. Port numbers range from 0 to 65535, thus performing a full scan for each port, to determine if the port of a particular resource is open, is computationally intensive.

It would therefore be advantageous to provide a solution that would overcome at least the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, method may include selecting a reachable resource having a network path to access the reachable resource, where the reachable resource is a cloud object deployed in a cloud computing environment, having access to an external network which is external to the cloud computing environment. Method may also include actively inspecting the network path to determine if the network path of the reachable resource is accessible from the external network. Method may furthermore include applying a policy on the accessible network path, where the policy includes a conditional rule. Method may in addition include initiating a mitigation action, in response to determining that the conditional rule is not met. Method may moreover include applying the policy on another network path, in response to determining that the conditional rule is met. Other embodiments of this aspect include corresponding computer systems, apparatus, and computer programs recorded on one or more computer storage devices, each configured to perform the actions of the methods.

Implementations may include one or more of the following features. Method may include: initiating active inspection for each network path of a plurality of network paths; storing an indicator to indicate that a first network path of the plurality of network paths is a valid path, in response to determining that the reachable resource is accessible from the external network; and applying the policy on the first network path. Method may include: initiating active inspection by generating an access instruction for the reachable resource; and executing the access instruction on a network path. Method may include: applying the policy only on each network path of the plurality of network paths which is a valid path. Method may include: initiating active inspection on each network path of the plurality of network paths to determine if the network path is a valid network path. Method may include: initiating the mitigation action on the reachable resource. Method where the mitigation action includes any one of: revoking access to the reachable resource, revoking access from the reachable resource, closing a port of the reachable resource, generating a notification, generating an alert, and any combination thereof. Method may include: generating an exception to the policy based on a valid network path. Method may include: initiating active inspection of the network path to detect an application path. Method may include: generating the mitigation action further based on the application path. Implementations of the described techniques may include hardware, a method or process, or a computer tangible medium.

In one general aspect, non-transitory computer-readable medium may include one or more instructions that, when executed by one or more processors of a device, cause the device to: select a reachable resource having a network path to access the reachable resource, where the reachable resource is a cloud object deployed in a cloud computing environment, having access to an external network which is external to the cloud computing environment. Medium may furthermore include one or more instructions that, when executed by one or more processors of a device, cause the device to: actively inspect the network path to determine if the network path of the reachable resource is accessible from the external network. Medium may in addition include one or more instructions that, when executed by one or more processors of a device, cause the device to: apply a policy on the accessible network path, where the policy includes a conditional rule. Medium may moreover include initiating a mitigation action, in response to determining that the conditional rule is not met. Medium may also include one or more instructions that, when executed by one or more processors of a device, cause the device to: apply the policy on another network path, in response to determining that the conditional rule is met. Other embodiments of this aspect include corresponding computer systems, apparatus, and computer programs recorded on one or more computer storage devices, each configured to perform the actions of the methods.

In one general aspect, system may include a processing circuitry. System may also include a memory, the memory containing instructions that, when executed by the processing circuitry, configure the system to: select a reachable resource having a network path to access the reachable resource, where the reachable resource is a cloud object deployed in a cloud computing environment, having access to an external network which is external to the cloud computing environment. System may in addition include instructions that, when executed by the processing circuitry, configure the system to: actively inspect the network path to determine if the network path of the reachable resource is accessible from the external network. System may moreover include instructions that, when executed by the processing circuitry, configure the system to: apply a policy on the accessible network path, where the policy includes a conditional rule. System may also include instructions that, when executed by the processing circuitry, configure the system to: initiate a mitigation action, in response to determining that the conditional rule is not met. System may furthermore include instructions that, when executed by the processing circuitry, configure the system to: apply the policy on another network path, in response to determining that the conditional rule is met. Other embodiments of this aspect include corresponding computer systems, apparatus, and computer programs recorded on one or more computer storage devices, each configured to perform the actions of the methods.

Implementations may include one or more of the following features. System where the memory contains further instructions which when executed by the processing circuitry further configure the system to: initiate active inspection for each network path of a plurality of network paths; store an indicator to indicate that a first network path of the plurality of network paths is a valid path, in response to determining that the reachable resource is accessible from the external network; and apply the policy on the first network path. System where the memory contains further instructions which when executed by the processing circuitry further configure the system to: initiate active inspection by generating an access instruction for the reachable resource; and execute the access instruction on a network path. System where the memory contains further instructions which when executed by the processing circuitry further configure the system to: apply the policy only on each network path of the plurality of network paths which is a valid path. System where the memory contains further instructions which when executed by the processing circuitry further configure the system to: initiate active inspection on each network path of the plurality of network paths to determine if the network path is a valid network path. System where the memory contains further instructions which when executed by the processing circuitry further configure the system to: initiate the mitigation action on the reachable resource. System where the mitigation action includes any one of: revoking access to the reachable resource, revoking access from the reachable resource, closing a port of the reachable resource, generating a notification, generating an alert, and any combination thereof. System where the memory contains further instructions which when executed by the processing circuitry further configure the system to: generate an exception to the policy based on a valid network path. System where the memory contains further instructions which when executed by the processing circuitry further configure the system to: initiate active inspection of the network path to detect an application path. System where the memory contains further instructions which when executed by the processing circuitry further configure the system to: generate the mitigation action further based on the application path. Implementations of the described techniques may include hardware, a method or process, or a computer tangible medium.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

FIG. 5 is a screenshot generated by an active inspector, implemented in accordance with an embodiment.

DETAILED DESCRIPTION

Figure 1:
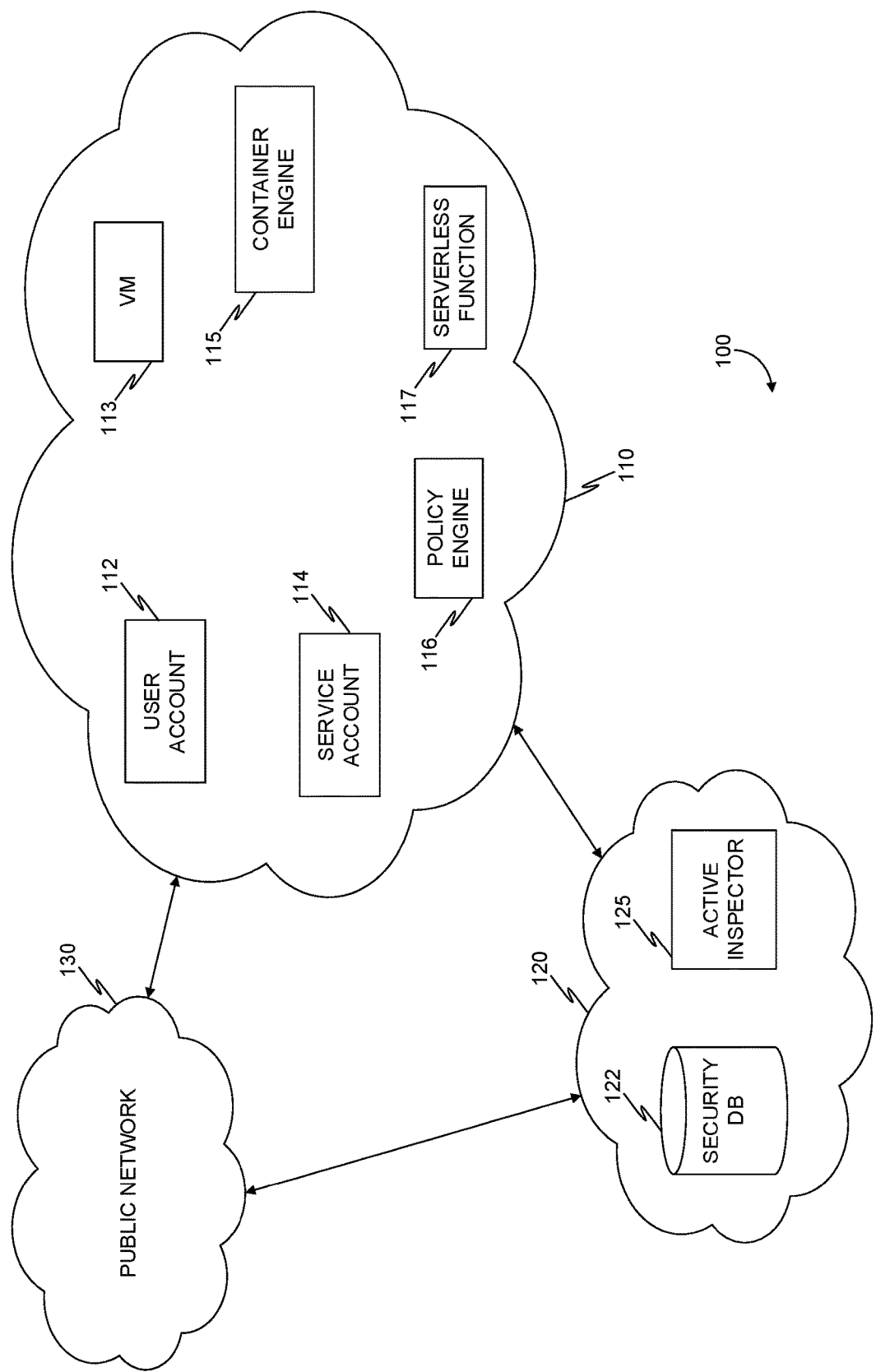
FIG. 1 is a diagram of a cloud computing environment monitored by an active inspector, implemented in accordance with an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a system and a method for applying a policy on a network path. According to an embodiment, Active inspection allows to generate instructions directed at the reachable resource over a network path, which when received by the reachable resource cause the reachable resource to send a response. For example, a reachable resource may have indicated that port 22 is an open port. Port 22 is typically associated with secure shell (SSH) protocol. In certain embodiments, a port may be associated with a plurality of applications, each application associated with an access instruction. An SSH session may be initiated with the reachable resource having an IP address at 10.0.0.256 on port 22, by providing an access instruction including "ssh user@10.0.0.256:22".

Discovering an application using the methods described herein allows to validate a tech stack as part of an external attack surface management (EASM) procedure in an efficient way, since only ports which are indicated, for example by static analysis, as being open are inspected to determine if access may occur. In an embodiment, only predetermined applications are checked for each open port, which further reduces the number of access instructions required to probe open ports, as the alternative is to test each probe for each application, which can easily result in hundreds of thousands of access instructions required to determine what applications are deployed on just a single resource.

Various techniques of static analysis can be used in order to determine reachability properties of a resource deployed in a cloud computing environment. Reachability properties, or parameters, may be utilized to establish a network path to the resource from an external network through the cloud computing environment. An access instruction may be generated based on the network path to determine if a network path generated through static analysis is indeed a viable path to reach the resource. Determining what network paths are viable is advantageous as it exposes what network paths can be used to access the cloud computing environment from external networks, and therefore what parts of the cloud computing environment are in practice opened to attack. These network paths should be addressed by system administrators as early as possible to minimize the effect of a cyber-attack.

Another aspect of the disclosed embodiments allows discovering a technology stack on a resource deployed in a cloud computing environment. In an embodiment a technology stack (or "tech stack") includes a collection of software files, such as an application, an operating system, a driver, a file system, and the like which are installed or deployed on a resource, such as a virtual machine, which in turn is deployed in a cloud computing environment. For example, Nginx® deployed on a virtual machine having a Linux® operating system has a technology stack (also referred to as a tech stack) which includes Nginx and Linux. In an embodiment a reachable resource is selected. A network protocol is detected for the reachable resource. In some embodiments, a security graph representing the cloud computing environment is traversed to determine what network protocol is available on the reachable resource. A network protocol may be, for example, a TCP protocol, UDP protocol, and the like. The network protocol may include an open port, on which an application of the reachable resource is listening. An open port does not necessarily indicate though what application is listening on that port.

FIG. 1 is an example diagram 100 of a cloud computing environment monitored by an active inspector, implemented in accordance with an embodiment. A first cloud environment 110 includes a plurality of principals and resources. A resource is a cloud entity which supplies functionality, such as processing power, memory, storage, communication, and the like. A resource may supply more than one functionality. Resources may include, for example, virtual machines (VMs) such as VMs 113, container engines such as container engines 115, serverless functions such as serverless functions 117, and the like. A VM may be implemented using Oracle® VirtualBox. A container engine may be implemented using Kubernetes® or Docker®. A serverless function may be implemented using Lambda®.

A principal is a cloud entity which acts on a resource, meaning it can request, or otherwise initiate, actions or operations in the cloud environment which cause a resource to perform a function. A principal may be, for example, a user account such as user account 112, a service account such as service account 114, a role, and the like. In an embodiment a user account 112 is implemented as a data structure which includes information about an entity, such as username, a password hash, an associated role, and the like.

The first cloud environment 110 may be implemented utilizing a cloud infrastructure, such as Amazon® Web Services (AWS), Microsoft® Azure, Google® Cloud Platform (GCP), and the like. In an embodiment, the first cloud environment 110 may be implemented as a virtual private cloud (VPC) on such a cloud infrastructure. The first cloud environment 110 may be, for example, a production environment for an organization. A production environment is a computing environment which provides services, for example, to client devices within the production environment and outside of it. An organization may also have a staging environment, which is a computing environment substantially identical to the production environment in at least some deployments of resource (e.g., workloads) which is used for the purpose of testing new policies, new permissions, new applications, new appliances, new resources, and the like, which are not present in the production environment.

It is often of upmost importance to an organization to keep the production environment in a fully operational state. Therefore, using an active scanner to test accessibility to the first cloud environment 110 may be detrimental to this objective, since it would require devotion of substantial resources at least in terms of network bandwidth to perform such tests.

An inspection environment 120 is communicatively connected with the first cloud environment 110, and a public network 130. The public network 130 is also communicatively connected with the first cloud environment 110. In an embodiment, the public network 120 may be, but is not limited to, a wireless, cellular or wired network, a local area network (LAN), a wide area network (WAN), a metro area network (MAN), the Internet, the worldwide web (WWW), similar networks, and any combination thereof.

The inspection environment 120 may be implemented as a VPC in a cloud infrastructure. In an embodiment, the cloud infrastructure of the inspection environment 120 may be the same cloud infrastructure as the first cloud environment 110. In some embodiments, the inspection environment may be implemented as multiple cloud environments, each utilizing a cloud infrastructure. The inspection environment includes a security graph database (DB) 122 for storing a security graph, and at least an active inspector 125.

In an embodiment, the security graph stored in the security graph DB 122 represents at least the first cloud environment 110 using a predefined data schema. For example, each resource and each principal of the first cloud environment 110 may be represented as a corresponding resource node or principal node in the security graph. The various nodes in the security graph may be connected, for example, based on policies, roles, permissions, and the like, which are detected in the first cloud environment 110. A predefined data schema may include data structures including into which values can be inputted to represent a specific cloud entity. For example, a resource may be represented by a template data structure which includes data attributes, whose values uniquely identify the resource, such as address, name, type, OS version, and the like.

The active inspector 125 is configured to receive a network path to access a resource in the first cloud environment 110. In an embodiment, a network path may be stored as a data string which includes one or more reachability parameters. Such parameters include host names, protocols, IP addresses, ports, usernames, passwords, and the like. In certain embodiments, the active inspector 125 is further configured to receive a list of network paths. The network paths may be received periodically. In certain embodiments, the active inspector 125 is also configured to generate an instruction which includes a query for the security graph, such instruction or instructions when executed by the security graph database 122 cause(s) generation of an output including one or more network paths. For example, network paths may be generated every 24 hours, while active inspection may occur once per day, once per week, once per month, and so on.

An example of a static analysis process for generating network paths, also known as determining reachability to a resource, is discussed in more detail in U.S. Pat. No. 11,374,982, the contents of which are hereby incorporated by reference herein. In an embodiment, the active inspector 125 may generate an instruction based on the network path to access the resource associated with the network path. For example, the instruction may be to send a data packet to an IP address of the resource, and receive an acknowledgement (ACK) response. The active inspector 125 may generate a log which includes, for example, the network path, the instruction sent by the active inspector 125, and any response(s) received from the resource. For example, if the active inspector 125 sends an HTTP (hypertext transfer protocol) request, a response may be a 404 error, a 403 error, 500 error, 502 error, and the like.

In an embodiment the active inspector 125 initiates active inspection of a network path to determine if a resource is accessible via the network path from a network which is external to the first cloud environment 110.

In some embodiments, the first cloud environment 110 further includes a policy engine 116. In certain embodiments, the policy engine 116 is implemented in the inspection environment 120. In an embodiment, the policy engine 116 includes a plurality of policies. In some embodiments, a policy includes a statement, a conditional rule, a combination thereof, and the like. In an embodiment, the policy engine 116 is configured to apply a policy on a network path, an application path, a combination thereof, and the like. In some embodiments, the active inspector 125 is configured to access a policy stored on the policy engine 116 and apply the policy on a network path, a valid network path, and the like.

Figure 2:
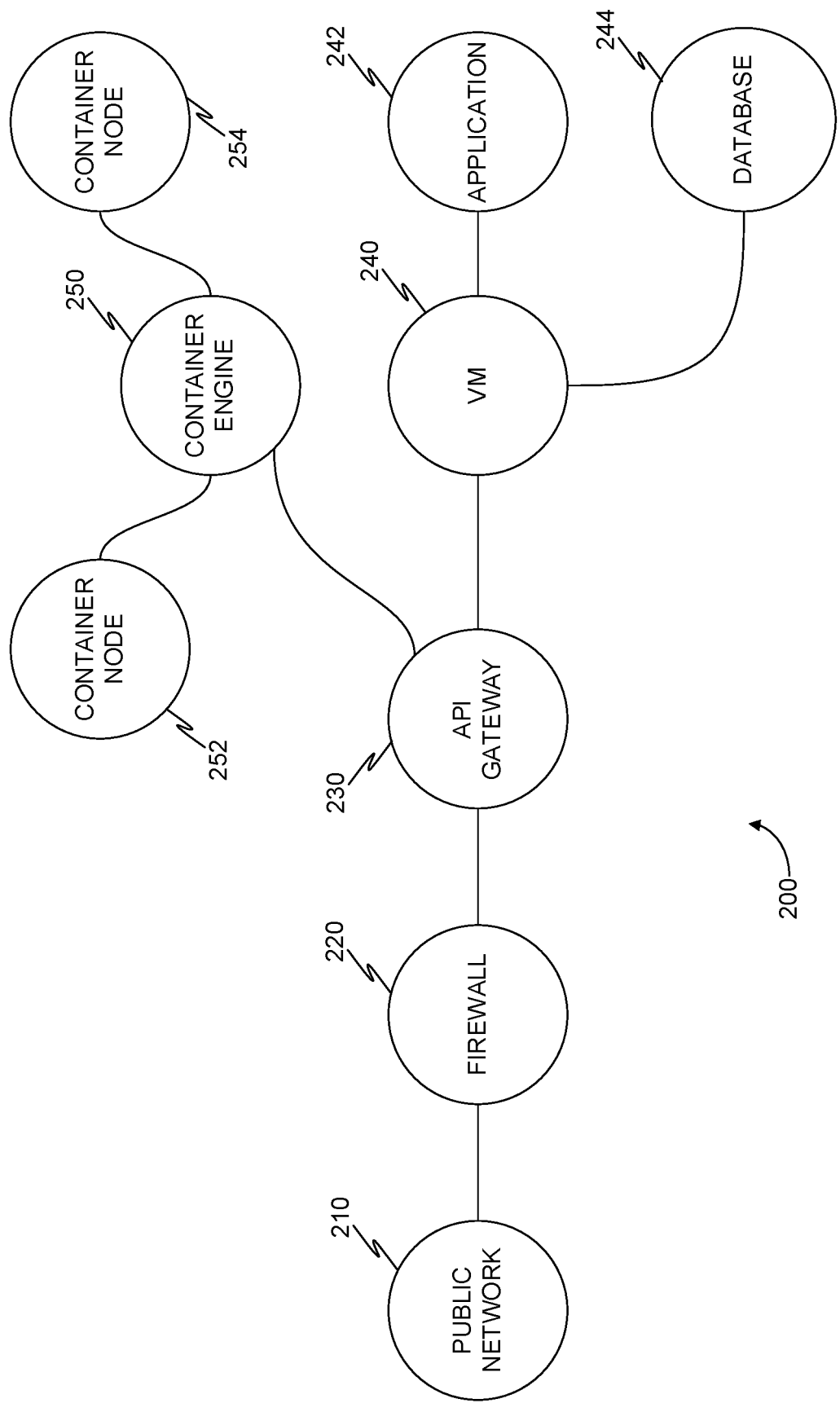
FIG. 2 is a security graph illustrating a network path, implemented in accordance with an embodiment.

FIG. 2 is an example of a security graph 200 illustrating a network path, implemented in accordance with an embodiment. The security graph 200 includes a plurality of nodes, each node connected to at least another node by an edge. In certain embodiments, a pair of nodes may be connected by a plurality of edges. In some embodiments, each edge may indicate a type of connection between the nodes. For example, an edge may indicate a "can access," to indicate that a cloud entity represented by a first node can access the cloud entity represented by a second node.

A first enrichment node 210 (also referred to as public network node 210) represents a public network, such as public network 130 of FIG. 1 above. An enrichment node, such as enrichment node 210, is a node generated based off of insights determined from data collected from a computing environment, such as the first cloud computing environment 110 of FIG. 1 above. An enrichment node may also represent, for example, a vulnerability. By connecting resource nodes in the graph to the enrichment node representing a vulnerability, the security graph 200 may indicate that the resources contain the vulnerability. This allows a compact representation as the security graph does not redundantly store multiple data fields of the same vulnerability in each resource node.

The public network node 210 is connected to a first resource node 220 (also referred to as firewall node 220) representing a firewall workload. The firewall represented by the firewall node 220 may be implemented, for example, as a virtual machine in the first cloud computing environment. Connecting the public network node 210 to the firewall node 220 represents that the firewall is open to transceiving communication between itself and the public network.

The firewall node 220 is further connected to a second resource node 230 (also referred to as API gateway node 230) which represents an API (application programming interface) gateway. An API gateway is a workload, for example a serverless function, which can act as a reverse proxy between a client and resources, accepting API calls, directing them to the appropriate service, workload, resource, etc. and returning a result to the client when appropriate.

The API gateway node 230 is connected to a first principal node 240 (also referred to as VM node 240) representing a virtual machine hosting an application and a database, and is also connected to a second principal node 250 (also referred to as container engine node 250) which hosts a plurality of container nodes. The VM node 240 is connected to an application node 242, and a database node 244. The application node 242 may indicate, for example, that a certain application, having a version number, binaries, files, libraries, and the like, is executed on the VM which is represented by the VM node 240.

In an embodiment, the VM node 240 may be connected to a plurality of application nodes. The database node 244 represents a database which is stored on the VM (represented by VM node 240) or stored on a storage accessible by the VM. The database node 244 may include attributes which define a database, such as type (graph, columnar, distributed, etc.), version number, query language, access policy, and the like.

Figure 3:
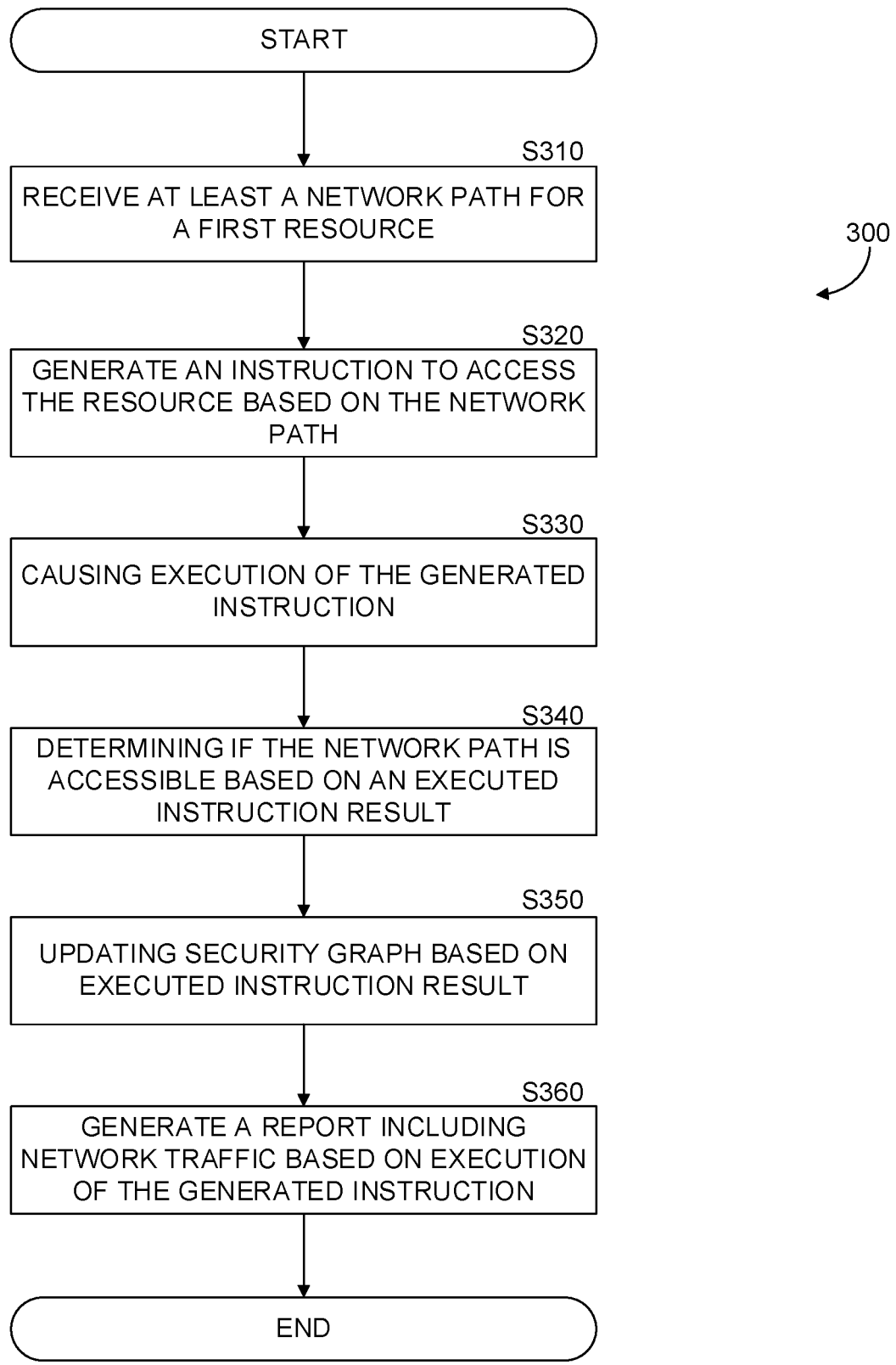
FIG. 3 is a flowchart of a method for performing active inspection of a cloud computing environment, implemented in accordance with an embodiment.

FIG. 3 is an example flowchart 300A of a method for performing active inspection of a cloud computing environment, implemented in accordance with an embodiment.

At S310, at least one network path for a first resource in a cloud computing environment is received. The network path, also known as object reachability, includes data (e.g. reachability parameters) for accessing the first resource from a public network, which is not the cloud computing environment of the first resource, such as the Internet. In an embodiment, an active inspector may receive the at least a network path, for example from a security graph. In an embodiment, S320 includes generating an instruction (or instructions) which when executed by a database system storing the security graph return a result of one or more resources, and a respective network path for each of the one or more resources. In certain embodiments, the network paths may be received periodically.

In some embodiments, the first resource may be one of a plurality of first resources, which are each substantially identical. For example, a group of virtual machines which are generated based on the same code or image are substantially identical, since their initial deployment would be identical other than a unique identifier assigned to each machine. In such embodiments it may be beneficial to inspect the at least one network path for a subset of the plurality of first resources, in order to decrease the computation and network resources required. This may be acceptable in such embodiments, as the expectation is that the plurality of VMs would be accessible in similar network paths. In some embodiments, the subset includes one or more first resources.

In an embodiment, each of the received network paths includes a set of reachability parameters to reach a specific cloud object in the cloud environment. The reachability parameters, and hence the network paths are generated by statically analyzing the cloud environment. An example method for such static analysis is described with reference to FIGS. 4A and 4B below.

At S320, an access instruction is generated to access the first resource based on the network path. In an embodiment, the access instruction is generated by the active inspector deployed outside of the cloud environment where the first resource resides. In certain embodiments, the instruction includes one or more access parameters. Such parameters may include, but are not limited to, a host name, an IP address, a communication protocol, a port, a username, a password, and the like, or combination thereof. A communication protocol may be, for example, HTTP or UDP (user datagram protocol). For example, the instruction may be a ping, GET, CONNECT, or TRACE request over HTTP.

In certain embodiments, a plurality of access instructions may be generated. For example, a plurality of generated access instructions may include a first access instruction having a first request, and a second access instruction having a second request which is different from the first request. For example, the first access instruction may include a CONNECT request, and the second access instruction may include a GET request. In certain embodiments, a plurality of first access instructions may be generated. In such embodiments, each first access instruction may include a same type of request (e.g., CONNECT) with different values (e.g., different web address, different port, and so on). For example, a resource may be reachable at IP address 10.0.0.127, at ports 800 through 805. The IP address and ports would be reachability parameters, based on which an active inspector can generate a plurality of first access instructions based on an HTTP GET request, such as:

GET /bin HTTP/1.1
Host:10.0.0.127:800 and further generate another HTTP GET request:

GET /bin HTTP/1.1
Host:10.0.0.127:801 and so on, which when executed attempt to access a /bin folder in the resource which has an IP address of 10.0.0.127. In certain embodiments, the active inspector (e.g., the active inspector 125 of FIG. 1) may connect to a proxy server (not shown) through the public network 130, and send a first access instruction to a resource in the cloud environment 110 through a first proxy server, and send a second access instruction (which may or may not be identical to the first access instruction) through a second proxy server. In such embodiments, each proxy server may show as originating from a different country of origin, therefore the source would receive access requests from seemingly different sources. This is advantageous to determine, for example, if a resource is configured to block certain network traffic based on geographic location.

At S330, execution of the generated access instruction is caused. The access instruction, when executed, causes an attempt to actually access the resource. In an embodiment, the attempt may result in network traffic being generated, including requests sent to the resource and answers (i.e., data packets) received. While static analysis provides a possible path to access a resource, executing the access instruction provides a real result of an attempt to utilize the possible path, in order to determine which paths are really viable, and which are not. For example, a path may be possible based on static analysis, but not viable, where, for example, an application deployed on the resource prevents such an access from occurring. In an embodiment a network path is determined to be viable (or accessible), if the access instruction, when executed does not return an error message. An error message may be, for example, a timeout (e.g., in response to a "ping" request), a 403 Forbidden (e.g., in response to an HTTP GET request), and the like. In some embodiments, the access instruction may be executed by the active inspector 125.

At S340, a determination is performed to determine if the network path is accessible, based on the execution of the generated access instruction. Performing an active inspection of a cloud environment allows to determine which of the reachability paths (i.e., network paths) are indeed vulnerable, meaning that paths that can be used to gain access into the cloud environment, and which reachability paths (network paths) are not vulnerabilities since the active inspector could not gain access to the resource, therefore the reachability path is not possible in practice. Reachability paths which have been confirmed through both static analysis (i.e., analysis using the security graph) and active inspection are paths which should therefore be considered more vulnerable. In an embodiment, if the network path results in successfully reaching the resource, the network path is determined to be accessible (or viable). If the resource is not reachable by the network path, the network path is determined to be inaccessible (or unviable).

At S350, a security graph is updated based on the network path determination. In certain embodiments, the active inspector may update the security graph, which includes a representation of the cloud environment in which the first resource is deployed, to indicate whether a reachability path is confirmed (i.e., is viable) by active inspection or not, where a confirmed path is a path through which the active inspector successfully accessed a resource. In turn, the security graph may update an alert generated based on determining that a resource has a reachability path through a public network.

At S360, a report is generated based on the execution of the generated instruction. In an embodiment, the report may be generated by the active inspector, which performs this method. In certain embodiments, generating a report may include updating a log with network traffic between the active inspector and the resource. For example, the active inspector may record (e.g., write to a log) the generated instruction, the resource identifier, and a response received from the resource. A response may include, for example, a response code. A response code may indicate success, redirection, client error, server error, and the like, where the client is the active inspector, and the server is the resource. In certain embodiments the security graph stored in the security DB 122 may be updated based on the determined viability of the network paths. For example, if a resource is successfully accessed, or successfully un-accessed (i.e., an attempt was made to access the resource and the attempt was not successful in accessing the resource), this result can be stored as an attribute of a node representing the resource in the security graph. For example, the VM node 240 of FIG. 2 may have an attribute which indicates a reachability status, which may have values corresponding to: successfully reached (i.e., an active inspector successfully accessed this resource), successfully not reach (i.e., an active inspector was not successful in accessing this resource), and undetermined (the active inspector has not yet attempted to access the resource through a network path). In some embodiments, certain network paths may be determined (i.e., as viable or unviable) while others may be undetermined. A node may be associated with a plurality of network paths, each having its own active inspection indicator.

In some embodiments, the active inspector may communicate with a virtual private network (VPN) or a proxy, in order to mask the IP address from which the active inspector is attempting access. This may be useful to test, for example, if a firewall, such as represented by the firewall node 220 of FIG. 2, will let communication through based on blocking or allowing certain IP addresses. In such embodiments, multiple similar instructions may be generated, each originating from a different IP address of the active inspector.

In some embodiments network path may include a plurality of resources. The method above may be performed on each resource of the plurality of resources, to determine the reachability of each resource.

Utilizing an active inspector using network paths generated from a security graph is advantageous, as attempting to access resources in this manner to determine the viability of a network path (i.e., reachability) requires less resources than, for example, randomly guessing network paths in an attempt to access resources.

In certain embodiments the active inspector may generate a screenshot of a user interface used to access the resource through the network path. FIG. 5 below is one such example of a screenshot of a user interface, implemented in accordance with an embodiment.

Furthermore, utilizing the active inspector to validate network paths and updating the security graph with the results allows to detect workloads which both contain a vulnerability, and have a validated network path. This allows generating an alert to a user of the cloud environment in order to address such problems by accurately characterizing cybersecurity threats. This in turn allows to utilize resources more efficiently, since the most vulnerable gaps in the cloud environment will be addressed first.

Figure 4A:
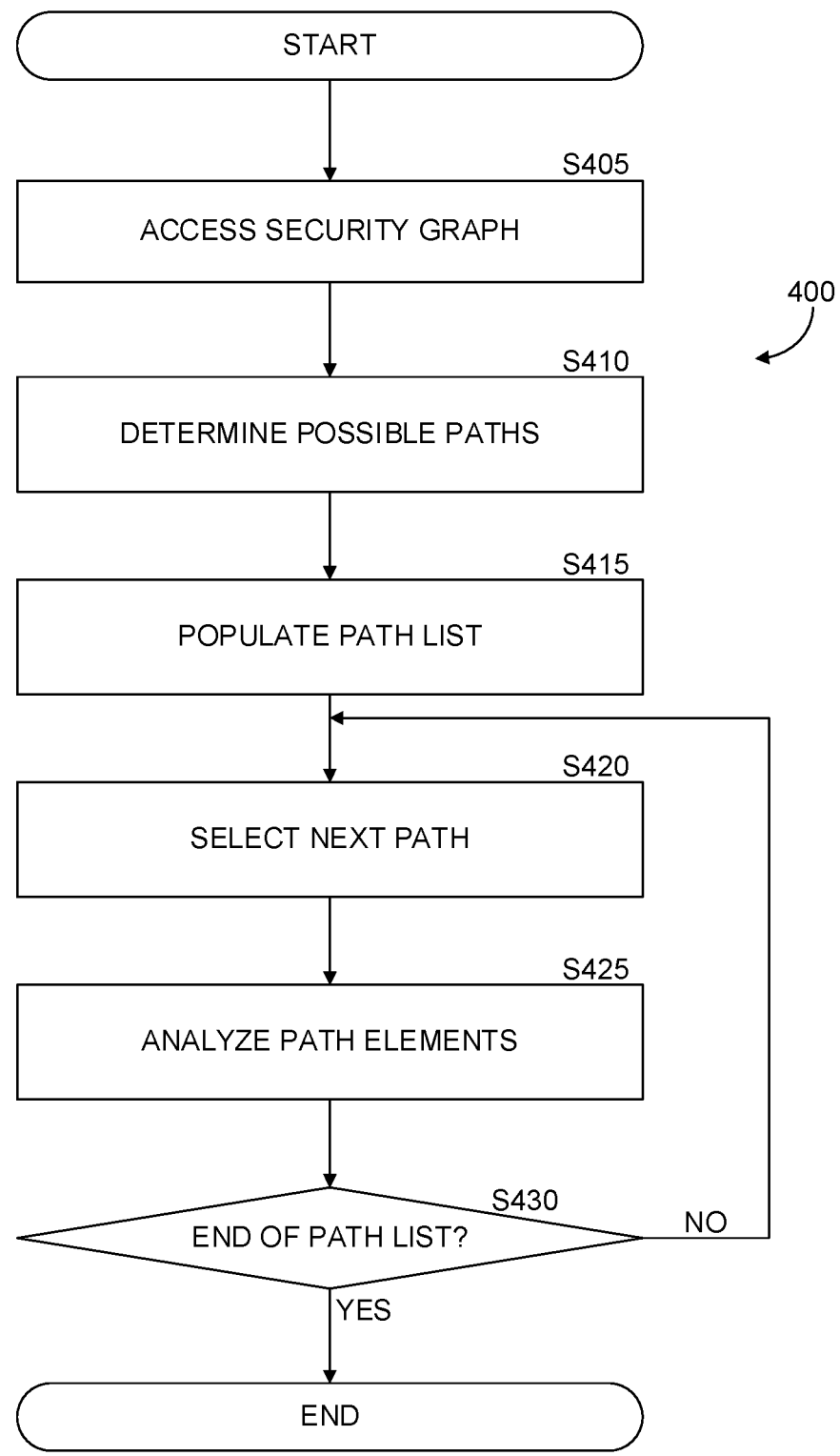
FIG. 4A is a flowchart depicting a method for determining reachable properties of security objects, according to an embodiment.

FIG. 4A is an example flowchart 400 depicting a method for determining reachable properties of security objects, according to an embodiment. A reachable property defines if and how an object on the generated security graph can be reached from an external or internal network, and/or an external or internal object. External means outside of the cloud environment of an organization. An object may be any computing or network object designated in a security graph generated as discussed above.

At S405, a security graph is accessed or otherwise obtained from the graph database. Within a security graph, various objects or entities, as may be included in a network or cloud environment of an organization, may be represented as "nodes" or "vertices," and such "nodes" or "vertices" may be interconnected by one or more "links" or "edges," the "links" or "edges" representing the relationships between the various objects included in a network or environment. Each object in the graph may be associated with known properties of the object. Examples for such properties may include an object's name, its IP address, various predefined security rules or access rules, and the like.

At S410, possible network paths within the obtained security graph are identified. A network path is a connection of two or more security objects accessible from an external or internal network, and/or an external or internal object. That is, a network path may include sequential representations of possible data/control flows between two or more objects in a graph. In an embodiment, where two objects in a graph are represented as vertices, and where the vertices are joined by an edge, a path may be constructed between the two vertices. A path may be a vertex-only path, describing a sequence of vertex-to-vertex "hops," an edge-only path, describing only the edges included in the sequence without description of the associated vertices, or a combined edge-vertex path, describing both edges and vertexes included in the sequence.

According to disclosed embodiments, a path shows a connection between security objects and/or computing objects that communicate over a network. An object may be a virtual, physical, or logical entity.

In an embodiment, paths can be identified by traversing the security graph. The traversal can start or end at objects that are connected to an external network (the internet). The traversal of the security graph can be performed using solutions disclosed in the related art, e.g., a breadth-first search (BFS), a tree traversal, and the like, as well as any combination thereof.

In another embodiment, paths can be identified by querying the graph database storing the security graph. Examples of applicable queries include, without limitation, queries configured to identify all paths between a first graph object (node) and a second graph object, queries configured to identify all paths between all graph vertices of a first object type and all graph vertices of a second object type, other, like, queries, and any combination thereof.

Following as performed at S410 through S430, the list of paths are iteratively identified to determine the reachability properties of the path. Specifically, at S415, a path list is populated to include all identified paths. A path list may be a table, list, or other type of data structure. A path list may be unordered or ordered, including ordering according to one or more path properties.

At S420, a path from the path list is selected. At a first run of the method a first path in the list is selected.

At S425, path elements are analyzed to determine reachable properties. Path element analysis, as at S425, is an iterative analysis of each element included in the path selected at S420. The operation of S425 is discussed in detail with reference to FIG. 4B.

At S430, it is determined whether the last path of the path list has been analyzed, and if so, execution terminates; otherwise, execution returns to S420.

Figure 4B:
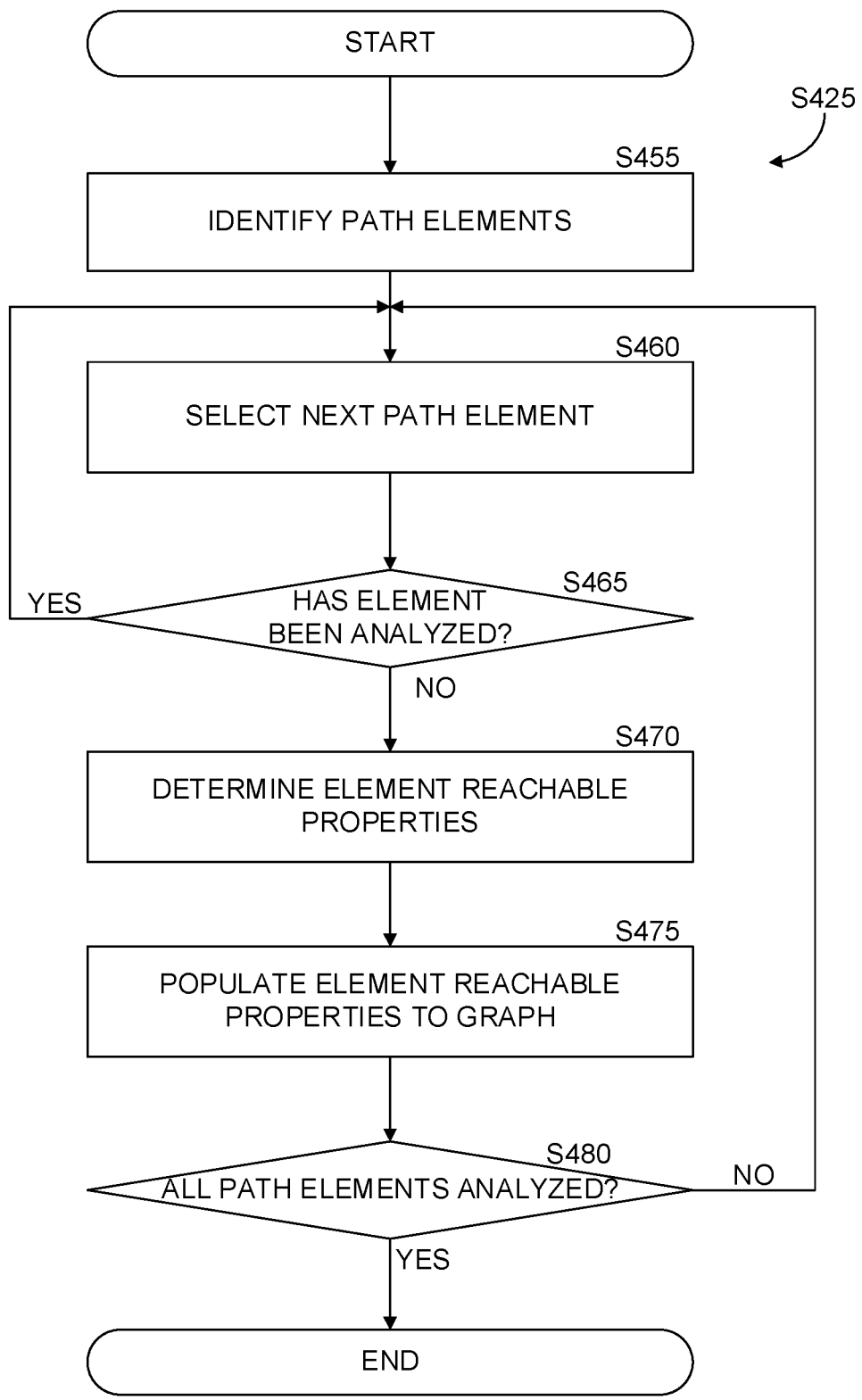
FIG. 4B is a flowchart depicting the analysis of a network path to determine reachable properties of objects included in the path, according to an embodiment.

FIG. 4B is an example flowchart S425 depicting the analysis of a network path to determine reachable properties of objects included in the path, according to an embodiment.

At S455, elements within a selected network path are identified. Elements are network and/or computing objects and relationships (or connections) between such objects. Identification of elements within the selected path may include, without limitation, identification based on properties, and other, like, data, included in the elements, identification of elements based on element identifications provided during the execution of S410 of FIG. 4A, above, and the like, as well as any combination thereof. Further, identification of in-path elements may include identification of element properties or attributes including, without limitation, names, network addresses, rulesets, port configurations, and the like, as well as any combination thereof.

Then, at S460 through S480, the list of paths are iteratively processed in order to determine reachable properties of the elements. Specifically, at S460, the next element is selected. The next element is a subsequent element of the set of elements, within the selected path, identified at S455. Where execution of S460 follows the execution of S480, the next element may be an element which, in the selected network path, immediately follows the element relevant to the preceding execution of S470 and S475. Where execution of the method described with respect to FIG. 4B includes a first execution of S460, the first execution of S460 may include the selection of a first element of the selected path.

For exemplary purposes, a network path may be a path from a virtual machine (VM), connected to a NIC, connected to a load balancer, connected to a firewall. According to a first example, where S460 is executed for the first time, the first execution of S460 may include the selection of the VM as the selected element. Further, according to a second example, where execution of S460 follows execution of S480, selection of a next element at S460 may include selection of, following the VM, selection of the NIC, or, following the NIC, selection of the load balancer, or, following the load balancer, selection of the firewall.

At S465, it is determined whether the selected element has been analyzed. Determination of whether the selected element may include the determination of whether one or more reachable properties are included in the relevant graph element. As execution of S475 provides for the population of reachable properties into the security graph, an element which does not include such reachable properties in the graph may be assumed to have not been analyzed.

Where, at S465, it is determined that the selected element has been analyzed, execution continues with S460. Where, at S465, it is determined that the selected element has not been analyzed, execution continues with S470.

At S470, reachable properties are determined. Reachable properties are object properties describing if, and how, a given path element is reachable through the selected path, and, specifically, from an external network, an internal network, both, and a combination thereof. Examples of reachable properties include, without limitation, binary properties describing whether an element is reachable, protocols by which the element is reachable, network addresses at which an element is reachable, ports by which an element is reachable, access rules, and the like, as well as any combination thereof.

In an embodiment, a reachable property is determined as a minimal set of reachable properties of all other objects in the path. As a simple example, if a path includes two objects, where one object can receive traffic from any source IP address through port 1515, and the other object can receive traffic only from a source IP address of 173.54.189.188, the reachable property of the second object may be that the second object is reachable through "source IP address 173.54.189.188 and port 1515."

At S475, reachable properties are populated into the security graph. Reachable properties, as may be determined at S470, may be populated into the graph by processes including, without limitation, labeling or tagging graph vertices (or "nodes"), updating network or graph object properties, generating one or more graph overviews, layers, or graph-adjacent data features, and the like, as well as any combination thereof.

In an embodiment, population of reachable properties into the security graph may include, for each object, population of object network access control lists (NACLs) as described hereinbelow, into the security graph elements corresponding with the various path elements, as well as the population of scope specific NACLs, and other, like, properties into the graph. Scope-specific NACLs are NACLs describing object, path, or network accessibility properties specific to a given scope, where a given scope may be the internet, various given accounts, various given environments, and the like. Scope-specific NACLs may, for example, describe the properties of an object with respect to the object's internet accessibility, where the object may be configured to include different access control properties for internet access and local intranet access.

Further, population of reachable properties into the graph may include population of one or more paths into the graph, including by population processes similar or identical to those described with respect to population of individual objects. Population of paths into the graph may include, without limitation, population of one or more paths into the graph, including a presently-analyzed path, population of one or more path properties, and the like, as well as any combination thereof. Path properties, as may be populated to a graph, are properties describing various attributes of a path, including, without limitation, NACLs applicable to path elements, path segments, or full paths, including full-path aggregate NACLs, and the like, as well as any combination thereof. Further, population of path properties into the graph may include the population of one or more scope-specific path properties, where such scope-specific path properties may be properties relevant to specific scopes, such as those described herein.

Where population of reachable properties includes labeling or tagging a graph, or elements thereof, one or more graph vertices or edges, the corresponding objects or relationships, or both, may be labeled, tagged, or otherwise associated with one or more data features describing relevant reachable properties. In addition, where population of reachable properties to the graph includes updating graph objects, graph vertices and edges, the corresponding objects and relationships, or both, may be directly updated to explicitly include the calculated properties.

Further, where population of reachable properties includes the generation of one or more graph layers or overlays, the generated graph layers or overlays may be data features independent of, but corresponding to, the relevant graphs, where the generated overlays or layers may include one or more data features describing the reachable properties of the various graph elements.

At S480, it is determined whether all elements in the selected path have been analyzed. Determination of whether all elements in the selected path have been analyzed may include, without limitation, determination of whether the immediately preceding execution of S475 relates to the last element in the selected path, determination of whether additional elements remain in the path, determination of whether any additional in-path elements have been analyzed, and the like, as well as any combination thereof.

Where, at S480, it is determined that all elements in the selected path have not been analyzed, execution continues with S460. Where, at S480, it is determined that all elements in the selected path have been analyzed, execution terminates.

FIG. 5 is an example of a screenshot 500 generated by an active inspector, implemented in accordance with an embodiment. A screenshot is an image which shows the contents of a computer display. In an embodiment, an active inspector, such as the active inspector 125 of FIG. 1, may include a web browser application for executing access instructions. The web browser application may generate a user interface intended for a display. The screenshot 500 includes a portion of such a user interface, which includes a response header 510 received based on a request to access a resource. In this case the response header 510 includes an HTTP code 403 (i.e., forbidden), meaning that the request to access the resource was denied. A detailed code 512 includes a message which is associated with the 403 code (i.e., "access denied"), a message 514, a request identifier 516, and a host identifier 518.

Figure 6:
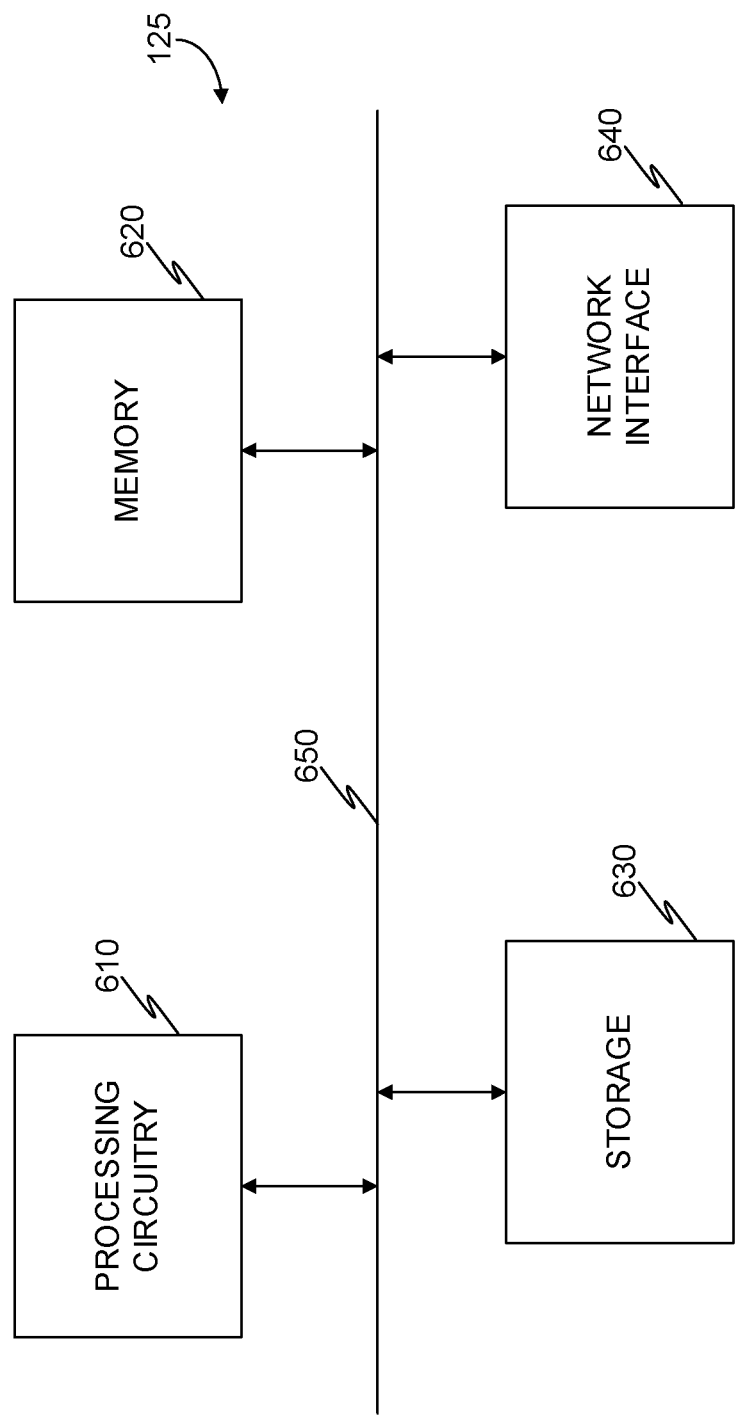
FIG. 6 is a schematic diagram of an active inspector according to an embodiment.

FIG. 6 is an example schematic diagram of an active inspector 125 according to an embodiment. The active inspector 125 includes a processing circuitry 610 coupled to a memory 620, a storage 630, and a network interface 640. In an embodiment, the components of the active inspector 125 may be communicatively connected via a bus 650.

The processing circuitry 610 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 620 may be volatile (e.g., random access memory, etc.), non-volatile (e.g., read only memory, flash memory, etc.), or a combination thereof.

In one configuration, software for implementing one or more embodiments disclosed herein may be stored in the storage 630. In another configuration, the memory 620 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 610, cause the processing circuitry 610 to perform the various processes described herein.

The storage 630 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 640 allows the active inspector 125 to communicate with, for example, a cloud environment, a security graph database, resources from the cloud environment, and the like.

It should be understood that the embodiments described herein are not limited to the specific architecture illustrated in FIG. 6, and other architectures may be equally used without departing from the scope of the disclosed embodiments.

Figure 7:
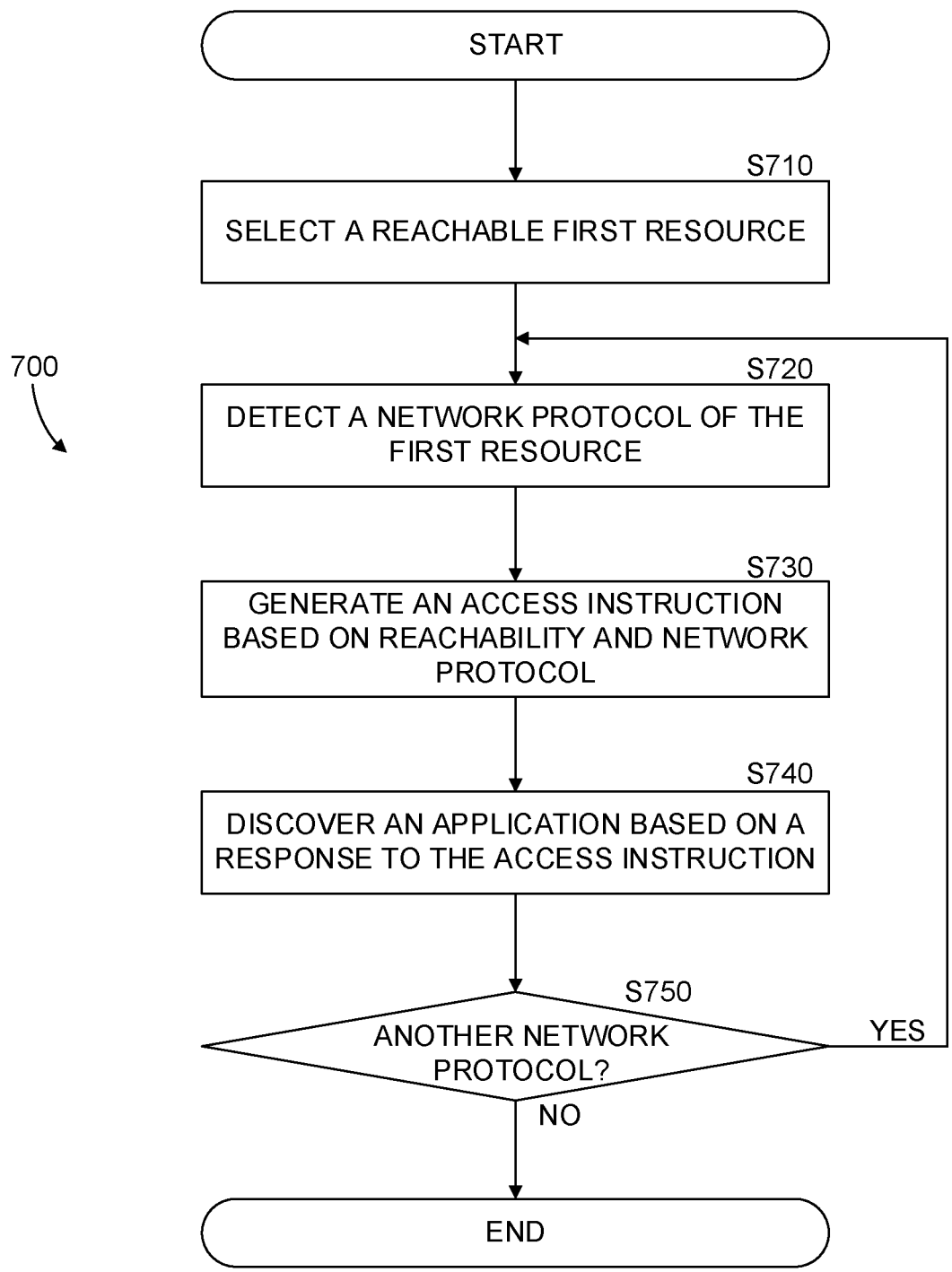
FIG. 7 is a flowchart of a method for detecting a technology stack utilizing active inspection, implemented in accordance with an embodiment.

FIG. 7 is an example flowchart of a method for detecting a technology stack utilizing active inspection, implemented in accordance with an embodiment. Technology stack is a term used to describe application, operating systems, and the like which are installed or deployed on a resource, such as a virtual machine, which in turn is deployed in a cloud computing environment. For example, Nginx® deployed on a virtual machine having a Linux® operating system has a technology stack (also referred to as a tech stack) which includes Nginx and Linux.

At S710, a reachable first resource is selected. In an embodiment, a reachable first resource may be selected from a list of reachable resources. The list may be stored, for example, as a table in a database. The list may include an identifier of each reachable resource, and at least one viable network path. A reachable resource is a resource which is reachable from an external network, in that the external network is external to a cloud computing environment in which the resource is deployed. In an embodiment, a reachable resource includes a network path, reachability parameters, and the like, for example as discussed in more detail above. A reachable resource is a resource which includes at least a viable network path, having reachability parameters which allow access from an external network to the resource, the resource deployed in a cloud computing environment. In an embodiment, a security graph may be queried to generate a result which includes at least a reachable resource. In certain embodiments, the generated result includes a plurality of reachable resources, each having its own at least a viable network path. In other embodiments, the result includes a plurality of network paths for a reachable resource (i.e., the resource is reachable from a plurality of network paths).

At S720, a network protocol is detected for the reachable first resource. In an embodiment, the network protocol is a transport layer protocol. For example, the network protocol may be any one of: a TCP protocol, and a UDP protocol. In an embodiment, the network protocol is any one of: hypertext transfer protocol (HTTP), file transfer protocol (FTP), secure shell (SSH), simple mail transfer protocol (SMTP), post office protocol (POP3), internet message access protocol (IMAP), internet relay chat (IRC), HTTP secure (HTTPS), and the like. In certain embodiments, a port may be determined for the network protocol. For example, the first reachable resource may be indicated as listening on (or having open) any one of port: 80, 20, 21, 22, 25, 110, 143, 194, 443, and the like. A port is a communication endpoint, and may be implemented as a 16-bit number.

In some embodiments, a security graph may be queried to determine if the reachable first resource includes an open port. A resource will not actively listen on all ports, as this is over sixty-five thousand different port numbers which are possible. In an embodiment, determining that a resource is actively listening on a port may be determined as part of the reachability parameters, for example as detailed above.

An open port is a port which a resource is actively listening for network traffic. While certain ports are considered well known ports (i.e., port 80 is used for HTTP) most are open for general use. Some network ports may be used by multiple applications. For example, port 6600 is used by Microsoft® Hyper-V Live, and by Music Player Daemon, which are two separate applications. Therefore, knowing that a port, or range of ports, is open, does not necessarily indicate what applications are deployed on the first resource.

As another example, port 8080 is used as an alternative for HTTP, used by Apache® Tomcat, and by Atlassian® JIRA applications. Therefore, knowing that a machine is listening on port 8080 does not indicate what applications are present.

At S730, an access instruction for accessing an application of the first resource is generated. In an embodiment the access instruction is based on the network protocol. In certain embodiments, accessing the first resource includes providing the first resource with credentials which allow access to the first resource. For example, a private key may allow accessing an SSH server. As another example, an API gateway, such as the API gateway 230 of FIG. 2 may be accessed by providing credentials. As yet another example, a load balancer (first resource) may provide access to a server (second resource), which listens on an application address. For example, an SSH server may be exposed behind a load balancer, listening on a local application address (e.g., 10.0.0.115). By accessing the load balancer, which includes an external network path, and from there accessing the application address, an attacker may gain access to the SSH server. In certain embodiments, the access instruction is generated based on a predetermined application which is associated with a port number. For example, a table may include a port number in a first column, and a network protocol in a corresponding second column.

In the example above, the first column may indicate 8080, the second column HTTP, another second column Tomcat, and the like. In some embodiments, a predetermined instruction may be stored which corresponds to the predetermined application. For example, the predetermined application may be HTTP, and the predetermined instruction may be a GET command. The access instruction may be further generated based on the predetermined instruction.

At S740, an application is discovered based on a response to the access instruction. In an embodiment, the access instruction, when executed, configures a computing device to initiate a communication over the network path. A response may be, for example, an ack (acknowledgement), which is received from the first resource in response to the access instruction. In an embodiment, a response to an HTTP request may include a status code, such as 500, 404, 200, 202, and the like. In certain embodiments, a security graph may be updated based on the discovered application.

In an embodiment, an application node may be generated in a security graph to represent the discovered application. The application node may be connected with an edge to a resource node representing the reachable first resource node, on which the application is deployed.

Discovering an application using the methods described herein allows to validate a tech stack as part of an external attack surface management (EASM) procedure in an efficient way, since only ports which are indicated, for example by static analysis, as being open are inspected to determine if access may occur. In an embodiment, only predetermined applications are checked for each open port, which further reduces the number of access instructions required to probe open ports, as the alternative is to test each probe for each application, which can easily result in hundreds of thousands of access instructions required to determine what applications are deployed on just a single resource.

At S750, a check is performed to determine if an additional network protocol should be checked. If 'yes' execution may continue at S720. Otherwise, execution may terminate. In an embodiment, the check may be further performed based on a response received based on execution of the access instruction. For example, if the access instruction was not successful, a second access instruction may be generated for example for the same port using a different protocol. In an embodiment the access instruction, second access instruction, and the like, are delivered over the network path of the reachable first resource.

Figure 8:
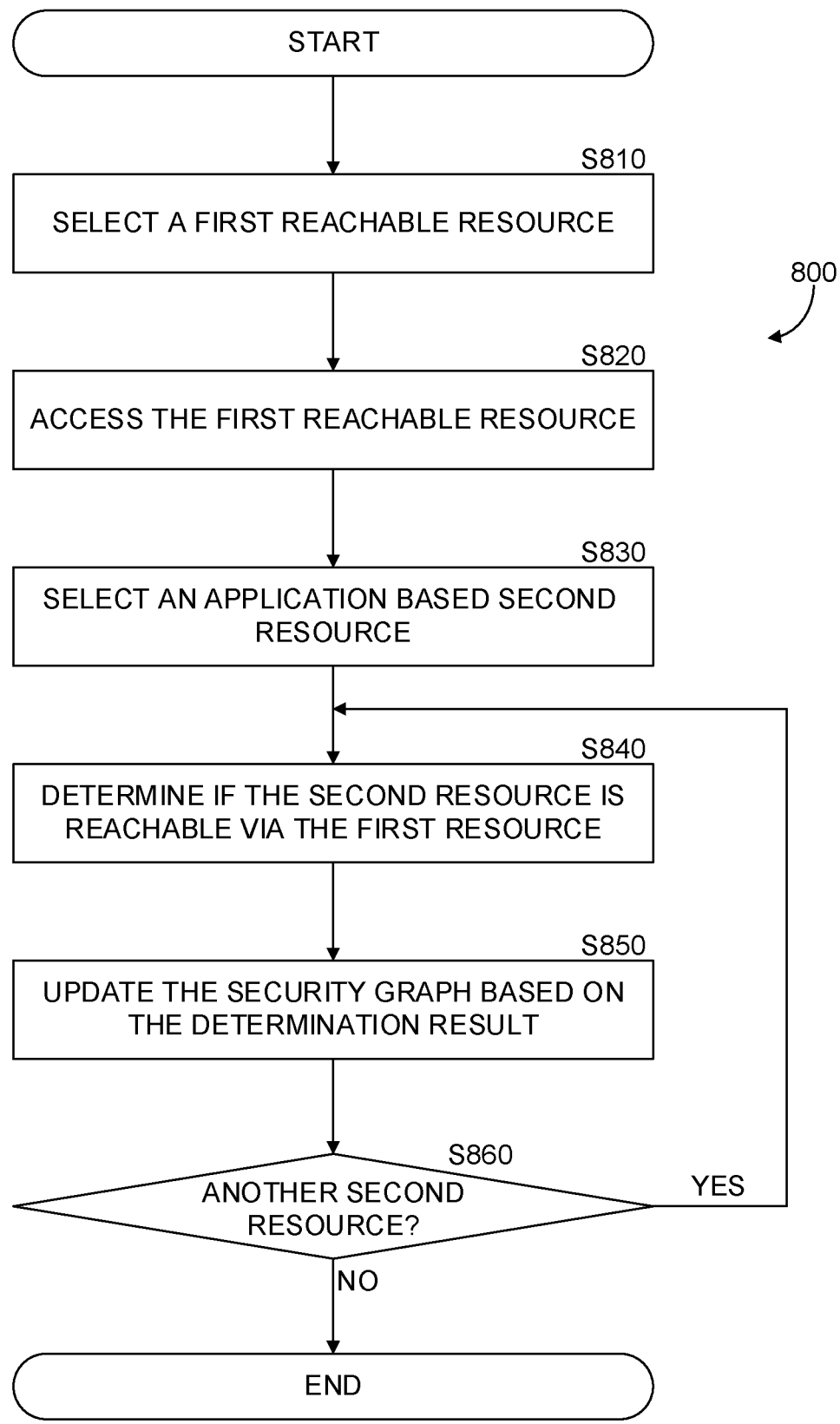
FIG. 8 is a flowchart of a method for detecting application paths, according to an embodiment.

FIG. 8 is an example flowchart 800 of a method for detecting application paths, according to an embodiment. An application path is a path an attacker may use when gaining access to a cloud computing environment, which includes a first resource through which the attacker gains access to the cloud computing environments, and subsequent second resources which the attacker is able to access in the cloud computing environment, after gaining access to the first resource, wherein the first resource corresponds to a virtual machine, container, and the like, and the second resource corresponds to an application executed (or deployed) on the first resource. In an embodiment, detecting an application path includes detecting a vulnerability which allows to reach a first resource, gain access to it, and through the first resource gain access to a second resource which is accessible to the first resource, but should not be accessible, for example, to the user account or service account accessing the first resource.

At S810, a reachable first resource is selected. In an embodiment, a reachable first resource may be selected from a list of reachable resources. The list may be stored, for example, as a table in a database. The list may include an identifier of each reachable resource, and at least one viable network path. A reachable resource is a resource which is reachable from an external network, in that the external network is external to a cloud computing environment in which the resource is deployed. In an embodiment, a reachable resource includes a network path, reachability parameters, and the like, for example as discussed in more detail above. A reachable resource is a resource which includes at least a viable network path, having reachability parameters which allow access from an external network to the resource, the resource deployed in a cloud computing environment. In an embodiment, a security graph may be queried to generate a result which includes at least a reachable resource. In certain embodiments, the generated result includes a plurality of reachable resources, each having its own at least a viable network path. In other embodiments, the result includes a plurality of network paths for a reachable resource (i.e., the resource is reachable from a plurality of network paths).

At S820, the first resource is accessed. In an embodiment, accessing the first resource includes providing the first resource with credentials which allow access to the first resource. For example, a private key may allow accessing an SSH server. As another example, an API gateway, such as the API gateway 230 of FIG. 2 may be accessed by providing credentials. As yet another example, a load balancer (first resource) may provide access to a server (second resource), which listens on an application address. For example, an SSH server may be exposed behind a load balancer, listening on a local application address (e.g., 10.0.0.115). By accessing the load balancer, which includes an external network path, and from there accessing the application address, an attacker may gain access to the SSH server.

At S830, a second resource is selected. In an embodiment, the second resource is an application exposed through the first resource. In an embodiment a security graph is queried to determine the second resource. In some embodiments, the cloud computing environment in which the first resource is deployed is represented in the security graph, for example as detailed in FIG. 2 above. In some embodiments, querying the security graph includes causing a query to be executed on a database hosting the security graph, and receiving as a result an identifier of a node which represents a second resource which is connected to the node representing the first resource.

For example, a security graph may be traversed to detect a node representing an application (application node) which is connected to the node representing the first resource. A second network path may be determined, to the application node from the first resource node. For example, the first resource may be accessed by accessing "example.com:80," while the second resource (i.e., application node) is accessed by using an application address, or other listening address. In an embodiment, an application may be predetermined to be listening on an address, port, and the like. The second network path may be generated based on the predetermined listening.

As another example, the application node may indicate that a web server application (second resource) is deployed on a virtual machine (first resource). An access attempt may include generating an access instruction on the first resource (first network path) using port 80 (second network path), which is a predetermined port used for Internet web traffic.

At S840, the second resource is actively determined to be reachable via the first resource. In an embodiment, a second resource is reachable from the first resource, if the first resource can be used to access the second resource. In the example above, if the web server is reachable through the virtual machine, then the web server is reachable. Thus, if the first resource is a reachable resource, meaning that a network path is found which is viable, and the second resource is accessible from the first resource, then an attacker which gains access to the first resource may also gain access to the second resource. Thus, while the second resource may not have a direct viable network path, it can still become reachable by accessing the first resource, meaning that there is a second network path, which is the network path between the first resource and the second resource. In an embodiment, a resource is accessible if, for example, it can be sent instructions which are then executed by the resource. For example, a SQL database may be determined to be reachable if a network path is determined to a virtual machine hosting the SQL database application, and a second network path allows access to the SQL database (i.e., application path), and further an instruction for performing an SQL injection is generated for execution by the SQL database application.

At optional S850, a security graph is updated based on the determination. In some embodiments, a node may include an indicator to indicate if a resource is reachable. In other embodiments, an edge may be added between a node representing the first resource and a node representing the second resource, to indicate that the second resource is reachable from the first resource. Actively inspecting second resources in this manner allows to detect certain vulnerabilities in a cloud computing environment, which is of course desirable.

At S860, a check is performed to determine if another second resource should be checked for reachability from the first resource. In an embodiment execution continues at S840 if another resource should be checked to determine reachability, otherwise execution terminates. For example, if another application is determined to be deployed on the first resource, e.g., by traversing a security graph and detecting another application node connected to the first resource node, a second application path may be determined and reachability thereto may be determined by performing the method detailed herein.

Figure 9:
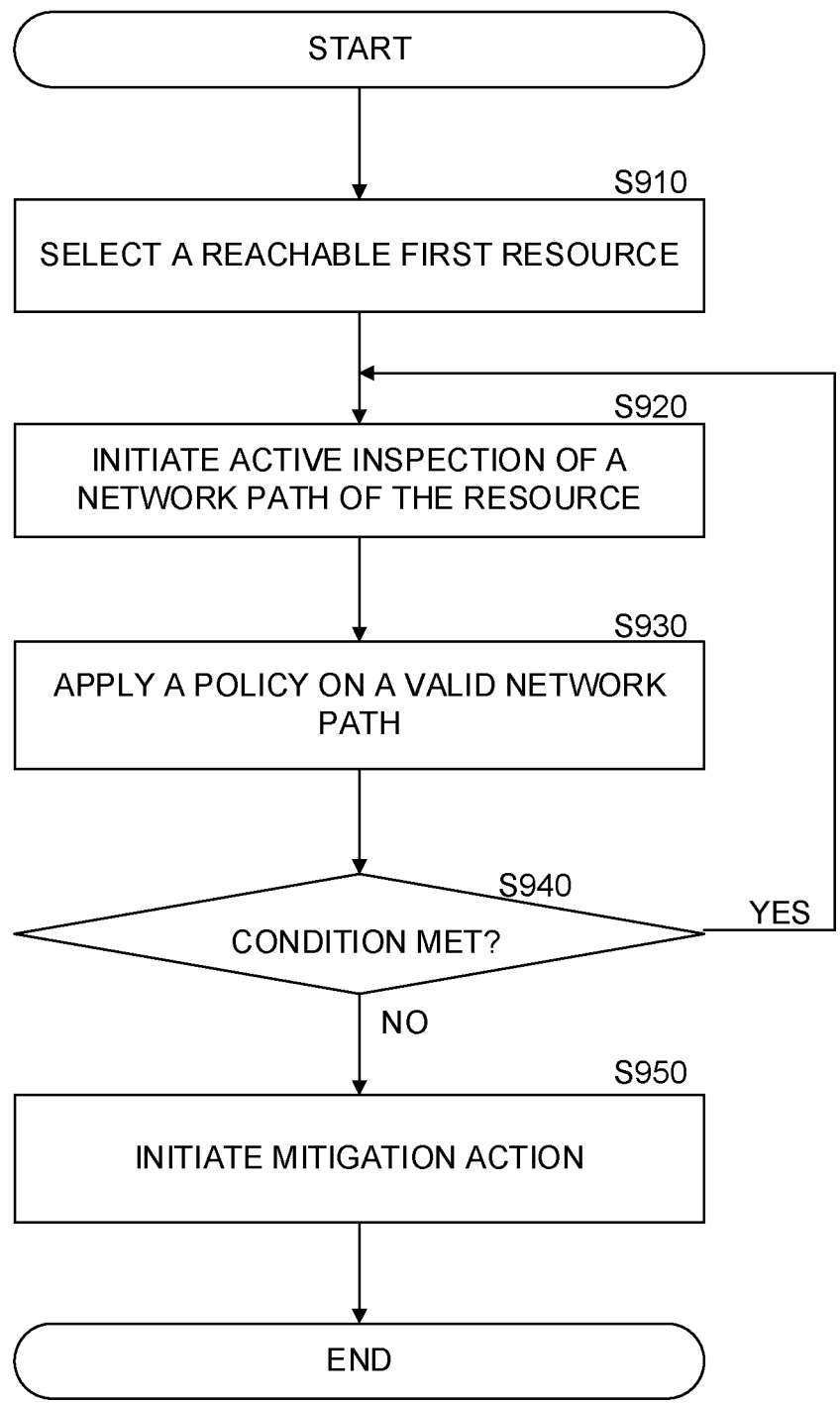
FIG. 9 is a flowchart of a method for applying a policy on a network path, implemented in accordance with an embodiment.

FIG. 9 is an example flowchart of a method for applying a policy on a network path. According to an embodiment, a network path includes resources, protocols, interfaces, combinations thereof, and the like, between a first resource in a cloud computing environment, and another interface, such as an interface of another computing device, an application programming interface (API), a second resource, and the like. In some embodiments, the network path is between the first resource and includes a network portion of a public network, such as the Internet.

According to some embodiments, it is advantageous to determine if a network path is a valid network path, i.e., a network path through which a resource is really reachable, as opposed to an invalid network path, which seems reachable, but in practice cannot be used to access the resource. For example, a resource might be listening on a certain port, which is blocked by a load balancer deployed on the network path of the resource. Therefore, the resource would seem to be accessible through the port, when in practice, it is not.

Therefore, in some embodiments, it is advantageous to determine which network paths, reachability paths, application paths, and the like, are valid paths, for example by performing active inspection of the same, as detailed above.

Furthermore, it is advantageous, in certain embodiments, to apply a policy on a network path, so that certain paths which are viable paths, and should not be viable paths, are addressed as cybersecurity threats. Also, it is further advantageous to apply such a policy, in some embodiments, only on a network path which is a valid network path, for example in order to reduce a number of alerts which are generated by a cybersecurity system, since a network path which is not a viable (or reachable) path is a network path which does not currently pose a cybersecurity threat, according to some embodiments.

At S910, a reachable first resource is selected. In an embodiment, a reachable first resource is selected from a list of reachable resources. In an embodiment, the list is stored, for example, as a table in a database. In some embodiments, the list includes an identifier of each reachable resource, and at least one viable network path.

In certain embodiments, a reachable resource is a resource which is reachable from an external network, in that the external network is external to a cloud computing environment in which the resource is deployed. In an embodiment, a reachable resource includes a network path, reachability parameters, and the like, for example as discussed in more detail above.

According to an embodiment, a reachable resource is a resource which includes at least a viable network path, having reachability parameters which allow access from an external network to the resource, the resource deployed in a cloud computing environment. For example, in an embodiment, the external network is a public network, such as the Internet.

In an embodiment, a security graph is queried to generate a result which includes at least a reachable resource. In certain embodiments, the generated result includes a plurality of reachable resources, each having a respective at least a viable network path. In some embodiments, the result includes a plurality of network paths for a reachable resource (i.e., the resource is reachable from a plurality of network paths).

At S920, active inspection of a network path is initiated. In an embodiment, the network path is a network path of the selected reachable first resource. In some embodiments, action inspection of the network path includes the methods described in more detail herein. For example, according to an embodiment, active inspection of the reachable first resource includes providing credentials which allow access to the first resource. For example, a private key may allow accessing an SSH server. As another example, an API gateway, such as the API gateway 230 of FIG. 2 is accessed by providing credentials, according to an embodiment.

As yet another example, a load balancer (first resource) is configured to provide access to a server (second resource), which listens on an application address. For example, an SSH server may be exposed behind a load balancer, listening on a local application address (e.g., 10.0.0.115). By accessing the load balancer, which includes an external network path, and from there accessing the application address, an attacker may gain access to the SSH server.

In an embodiment, active inspection includes generating an instruction which when executed configures a computing device to send a data packet through a network path. In certain embodiments, the data packet, a plurality of data packets, and the like, include an instruction which when executed by the reachable resource configure the resource to generate a response to the instruction.

At S930, a policy is applied on a valid network path. In some embodiments, an active inspector is configured to determine that a network path is a valid network path. In certain embodiments, in response to determining that a network path is a valid network path, the active inspector is further configured to apply a policy to the network path.

In some embodiments, applying a policy on a network path includes applying a conditional rule. For example, in some embodiments, applying the policy on a network path includes generating an instruction which, when executed, generates an output on which the conditional rule can be applied.

In certain embodiments, the instruction includes an additional active inspection. For example, according to an embodiment, a policy includes a statement that a network path to/from a first reachable resource should only be accessible via a predefined port (e.g., port 80) using a predefined protocol (e.g., HTTPS). In some embodiments, where a viable network path is detected, the policy is applied to determine if the network path adheres to the policy or not.

For example, in such an embodiment, an active inspection instruction is generated which, when executed, configures the active inspector to attempt to access the first reachable resource over the network path, using port 8080 and HTTPS. As another example, the action inspection instruction, when executed, configures the active inspector to attempt to access the first reachable resource over the network path, using port 80 and HTTP (which is the unsecure version of HTTPS).

In some embodiments, a plurality of active inspection instructions are generated and executed, to determine if the policy is adhered to. In some embodiments, a policy includes an exception. For example, in certain embodiments, a certain resource is exempt from a certain policy a priori. In some embodiments, a policy exemption is generated based on a list of predefined resources, resource types, a combination thereof, and the like, which are exempt from a particular policy, a particular policy type, a combination thereof, and the like.

In certain embodiments, active inspection is further performed to detect an application path. In some embodiments, the policy is applied to the application path, the network path, a combination thereof, and the like. For example, in some embodiments, a policy includes a statement such that a valid network path violates the policy, however an application path utilizing the network path, allows to create an exemption for the network path. For example, a policy includes a statement, according to an embodiment, that no resource should allow communication over port 80, unless the communication is specifically for a predefined application which is configured to communicate over this port.

At S940, a check is performed to determine if a condition is met. In an embodiment, the condition is a condition of the policy, such as a conditional rule. In some embodiments, the condition includes determining if the policy is adhered to by the network path. In some embodiments, this is determined, for example, as detailed above (e.g., by applying a rule and checking the result of the outcome). Where the condition is satisfied (e.g., the network path adheres to the policy), execution continues at S920, according to an embodiment. In certain embodiments, where the condition is not satisfied (e.g., the network path does not adhere to the policy), execution continues at S950.

At S950, a mitigation action is initiated. In some embodiments, the mitigation action includes generating a policy exemption. In certain embodiments, the mitigation action includes revoking access to the reachable resource, revoking access from the reachable resource, closing a port of the reachable resource, generating a notification, generating an alert, any combination thereof, and the like.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for applying a policy on a network path, comprising:
    selecting a reachable resource having a network path to access the reachable resource, wherein the reachable resource is a cloud object deployed in a cloud computing environment, having access to an external network which is external to the cloud computing environment;
    actively inspecting the network path to determine if the network path of the reachable resource is accessible from the external network;
    storing an indicator to indicate that the network path is a valid path, in response to determining that the reachable resource is accessible from the external network;
    applying a policy on the valid path, wherein the policy includes a conditional rule;
    initiating a mitigation action, in response to determining that the conditional rule is not met; and
    applying the policy on another network path, in response to determining that the conditional rule is met.

2. The method of claim 1, further comprising:
    initiating active inspection for each network path of a plurality of network paths; and
    applying the policy only on a network path of the plurality of network paths which is a valid path.

3. The method of claim 2, further comprising:
    initiating active inspection by generating an access instruction for the reachable resource; and
    executing the access instruction on a network path.

4. The method of claim 2, further comprising:
    applying the policy only on each network path of the plurality of network paths which is a valid path.

5. The method of claim 4, further comprising:
    initiating active inspection on each network path of the plurality of network paths to determine if the network path is a valid network path.

6. The method of claim 1, further comprising:
    initiating the mitigation action on the reachable resource.

7. The method of claim 6, wherein the mitigation action includes any one of: revoking access to the reachable resource, revoking access from the reachable resource, closing a port of the reachable resource, generating a notification, generating an alert, and any combination thereof.

8. The method of claim 1, further comprising:
    generating an exception to the policy based on a valid network path.

9. The method of claim 1, further comprising:
    initiating active inspection of the network path to detect an application path.

10. The method of claim 9, further comprising:
    generating the mitigation action further based on the application path.

11. A non-transitory computer-readable medium storing a set of instructions for applying a policy on a network path, the set of instructions comprising:
    one or more instructions that, when executed by one or more processors of a device, cause the device to:
    select a reachable resource having a network path to access the reachable resource, wherein the reachable resource is a cloud object deployed in a cloud computing environment, having access to an external network which is external to the cloud computing environment;
    actively inspect the network path to determine if the network path of the reachable resource is accessible from the external network;
    storing an indicator to indicate that the network path is a valid path, in response to determining that the reachable resource is accessible from the external network;
    apply a policy on the valid path, wherein the policy includes a conditional rule;
    initiate a mitigation action, in response to determining that the conditional rule is not met; and
    apply the policy on another network path, in response to determining that the conditional rule is met.

12. A system for applying a policy on a network path comprising:
    a processing circuitry; and
    a memory, the memory containing instructions that, when executed by the processing circuitry, configure the system to:
    select a reachable resource having a network path to access the reachable resource, wherein the reachable resource is a cloud object deployed in a cloud computing environment, having access to an external network which is external to the cloud computing environment;

actively inspect the network path to determine if the network path of the reachable resource is accessible from the external network;

store an indicator to indicate that the network path is a valid path, in response to determining that the reachable resource is accessible from the external network;

apply a policy on the valid path, wherein the policy includes a conditional rule;

initiate a mitigation action, in response to determining that the conditional rule is not met; and apply the policy on another network path, in response to determining that the conditional rule is met.

13. The system of claim 12, wherein the memory contains further instructions which when executed by the processing circuitry further configure the system to:

initiate active inspection for each network path of a plurality of network paths; and apply the policy only on a network path of the plurality of network paths which is a valid path.

14. The system of claim 13, wherein the memory contains further instructions which when executed by the processing circuitry further configure the system to:

initiate active inspection by generating an access instruction for the reachable resource; and execute the access instruction on a network path.

15. The system of claim 13, wherein the memory contains further instructions which when executed by the processing circuitry further configure the system to:

apply the policy only on each network path of the plurality of network paths which is a valid path.

16. The system of claim 15, wherein the memory contains further instructions which when executed by the processing circuitry further configure the system to:

initiate active inspection on each network path of the plurality of network paths to determine if the network path is a valid network path.

17. The system of claim 12, wherein the memory contains further instructions which when executed by the processing circuitry further configure the system to:

initiate the mitigation action on the reachable resource.

18. The system of claim 17, wherein the mitigation action includes any one of:

revoking access to the reachable resource, revoking access from the reachable resource, closing a port of the reachable resource, generating a notification, generating an alert, and any combination thereof.

19. The system of claim 12, wherein the memory contains further instructions which when executed by the processing circuitry further configure the system to:

generate an exception to the policy based on a valid network path.

20. The system of claim 12, wherein the memory contains further instructions which when executed by the processing circuitry further configure the system to:

initiate active inspection of the network path to detect an application path.

21. The system of claim 20, wherein the memory contains further instructions which when executed by the processing circuitry further configure the system to:

generate the mitigation action further based on the application path.

* * * * *